Figure 1:
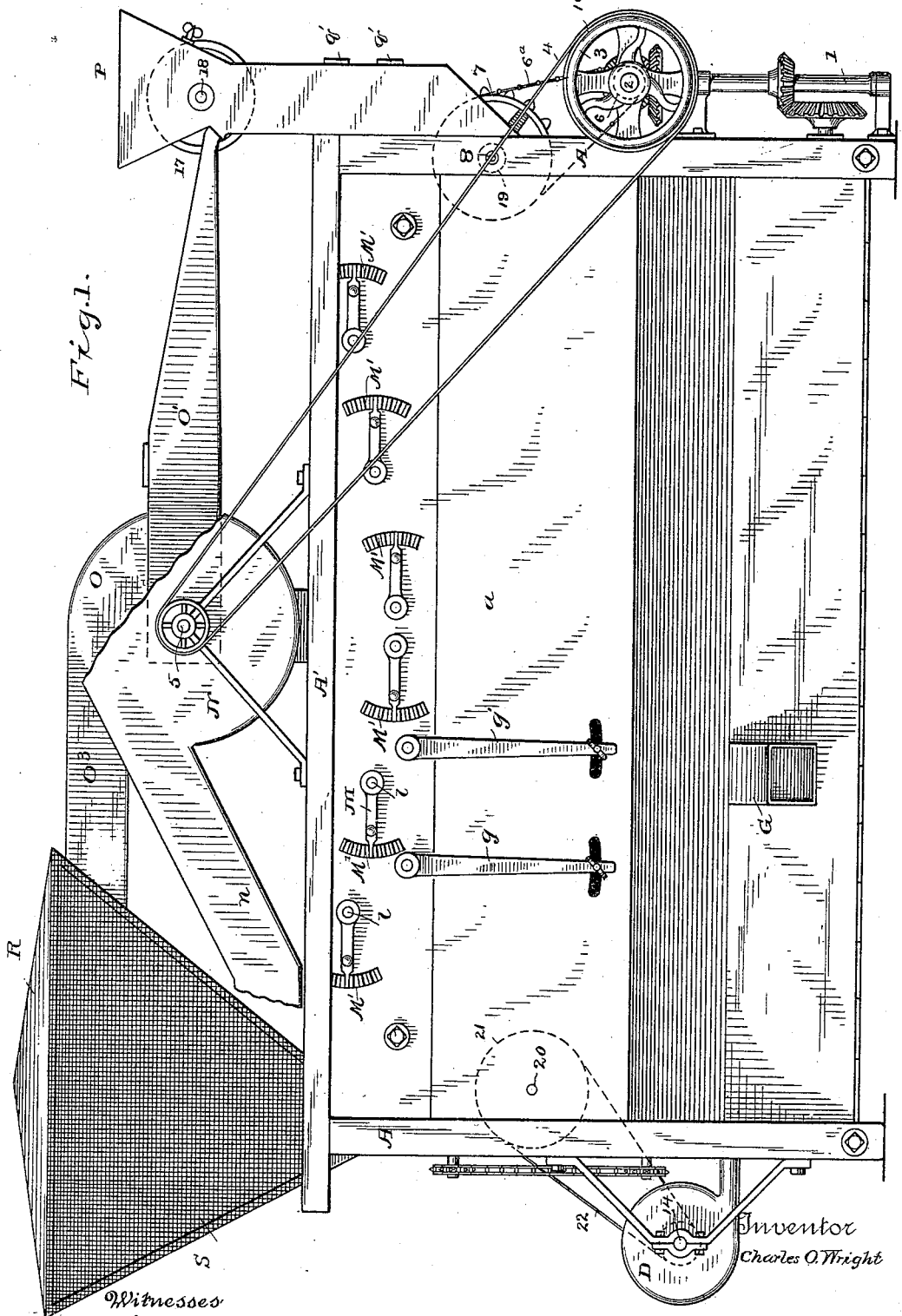

(No Model.)
4 Sheets—Sheet 1.

C. O. WRIGHT.
MIDDLINGS SEPARATOR AND DOUBLE PURIFIER.

No. 427,027. Patented Apr. 29, 1890.

Witnesses
H. A. Lamb
C. S. Sturtevant.

Inventor
Charles O. Wright
Frankland James.

(No Model.)  4 Sheets—Sheet 2.

C. O. WRIGHT.
MIDDLINGS SEPARATOR AND DOUBLE PURIFIER.

No. 427,027.  Patented Apr. 29, 1890.

Witnesses
H. A. Lamb
C. S. Sturtevant

Inventor
Charles O. Wright
Frankland Jannus,
Attorney (No Model.) 4 Sheets—Sheet 3.
C. O. WRIGHT.
MIDDLINGS SEPARATOR AND DOUBLE PURIFIER.
No. 427,027. Patented Apr. 29, 1890.
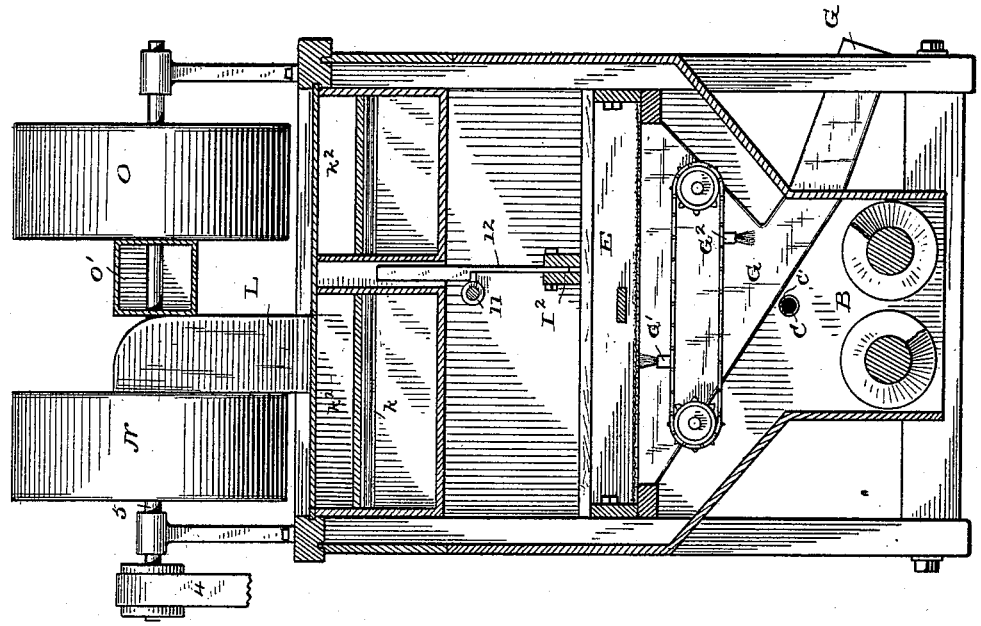
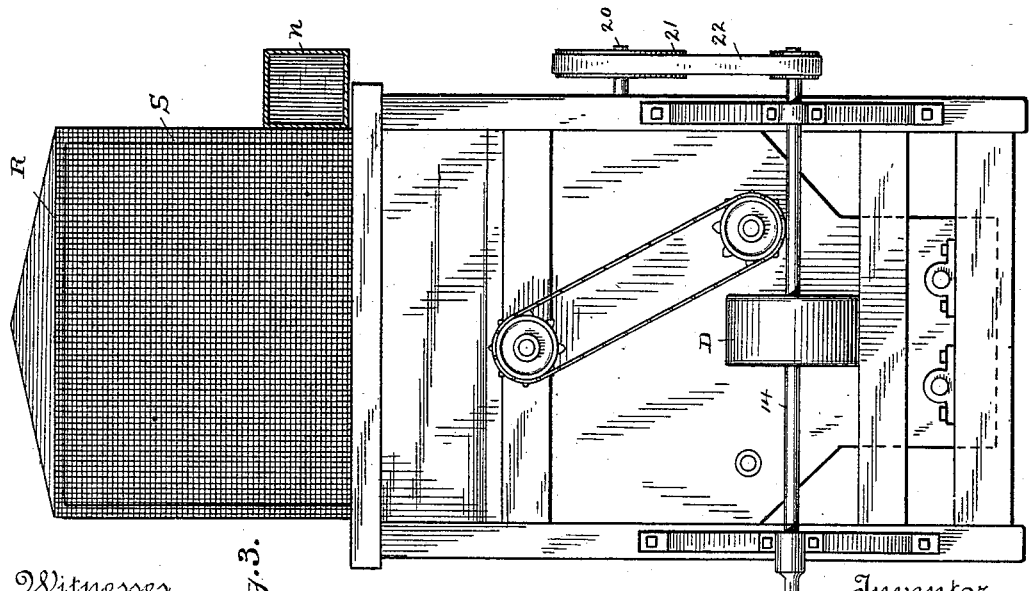
Witnesses
H. A. Lamb
O. L. Sturtevant
Inventor
Charles O. Wright
Frankland Jannus
Attorney (No Model.) 4 Sheets—Sheet 4.

C. O. WRIGHT.
MIDDLINGS SEPARATOR AND DOUBLE PURIFIER.

No. 427,027. Patented Apr. 29, 1890.

Witnesses
H. A. Laws
C. S. Sturtevant,

Inventor
Charles O. Wright
By
Frankland Jannus,
Attorney

UNITED STATES PATENT OFFICE.

CHARLES ORVILLE WRIGHT, OF RICHMOND, VIRGINIA.

MIDDLINGS SEPARATOR AND DOUBLE PURIFIER.

SPECIFICATION forming part of Letters Patent No. 427,027, dated April 29, 1890.

Application filed March 7, 1889. Serial No. 302,278. (No model.)

*To all whom it may concern:*

Be it known that I, CHARLES ORVILLE WRIGHT, a citizen of the United States, residing at Richmond, in the county of Henrico and State of Virginia, have invented certain new and useful Improvements in Middlings Separator and Double Purifier, of which the following is a description, reference being had to the accompanying drawings, and to the letters and figures of reference marked thereon.

My invention relates to apparatus for purifying middlings.

In the art of purifying middlings it is usual to pass the middlings through a separator, and then direct the coarse product to one purifying-machine and the fine to another, in order that the separate grades of middlings may be operated upon by air-blasts to separate therefrom the dust and other impurities without losing any of the good material. The action of separating impurities from the middlings by an air-blast is so delicate that were it attempted to operate upon the coarse and fine middlings as they come from the bolting-reel an air-blast strong enough to purify the coarse middlings would carry off valuable material from the finer middlings; hence the necessity for their separation. Middlings have been separated into coarse and fine by the use of screens, the separating device and the two purifying-machines required to operate thereon constituting three separate machines. According to my invention the process is greatly simplified, and a machine is produced in which the operations of separating and subsequent purification of both coarse and fine middlings are carried on simultaneously in one machine. According to my invention the stream of mixed middlings passes into a hopper, and from thence downward into a channel provided with shelves or deflectors, over which it falls and is spread. Regulable air-inlets are provided at one side of the vertical channel and a passage leading to an exhaust-fan at the other. From the exhaust-fan a passage extends to a device which I have termed a "catcher," which comprises a number of vertical reticulated diaphragms inclosed within a case having walls of cloth or other material which will allow of the escape of air, but not of even the finest dust. The catcher leads to a sieve suitable for the reception and treatment of what are known as "fine middlings." The discharge-spout of the vertical channel leads to a second sieve suitable for the reception and treatment of what are known as "coarse middlings." As the material is delivered to the hopper above the separating-spout, it will fall from shelf to shelf and be spread or distributed thereby, and as the said material passes downward the suction of the fan will take out from it all the finer and lighter particles, comprising light bran, germs, fine middlings, &c., and deliver them to the catcher, where they are arrested and allowed to fall downward through suitable passages to the fine-middlings sieve. The coarser and heavier particles—what are known as "coarse middlings"—will not be affected by the suction of the fan, and will therefore continue to fall from shelf to shelf, and, passing entirely through the separator, be discharged at the head of the coarse-middlings sieve. Suitable valves are provided in the side walls of the separator to admit a greater or less quantity of air, and thereby regulate the action of the suction-fan to cause it to draw off from the descending stream material of only the desired grade. The sieves are suitably shaken and knocking devices provided, also brushes traveling across their under sides. Above the sieves is a valve-chamber communicating at its upper side with a second fan, the valve-chamber being designed to afford perfect regulation of the purifying-fan upon the material in the sieves.

A machine embodying my invention will be hereinafter described, and referred to in the appended claims.

Figure 2:
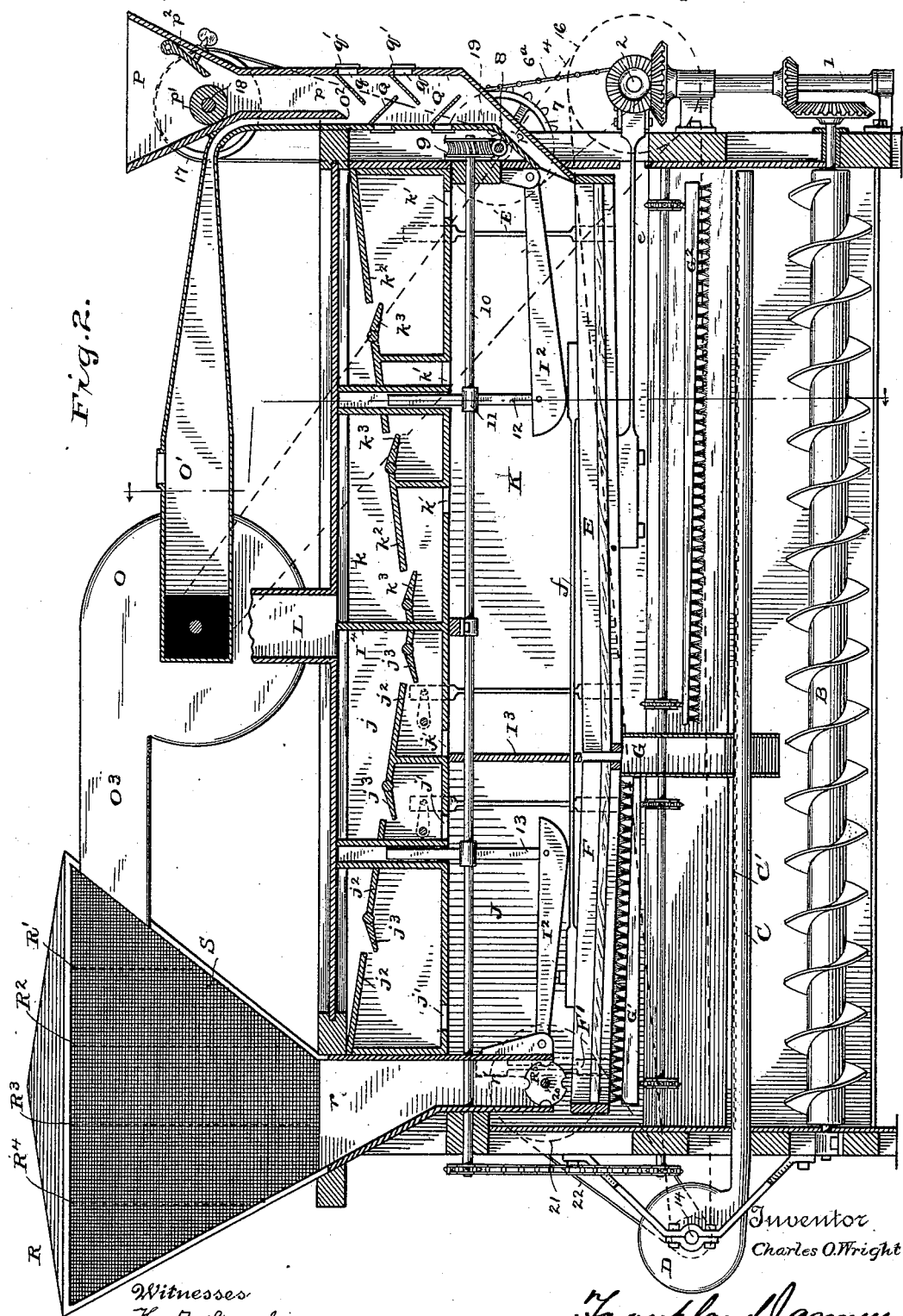
Figure 5:
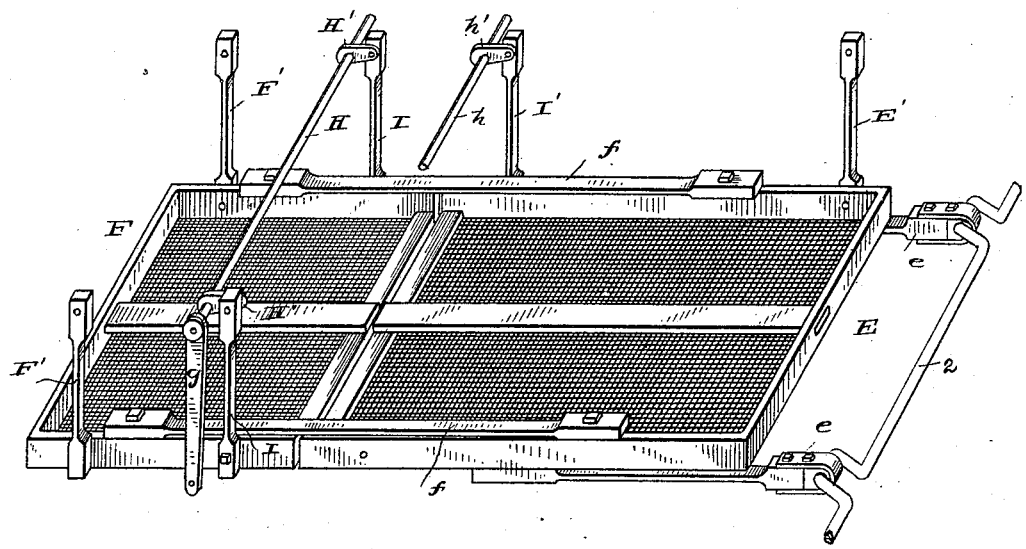
Figure 6:
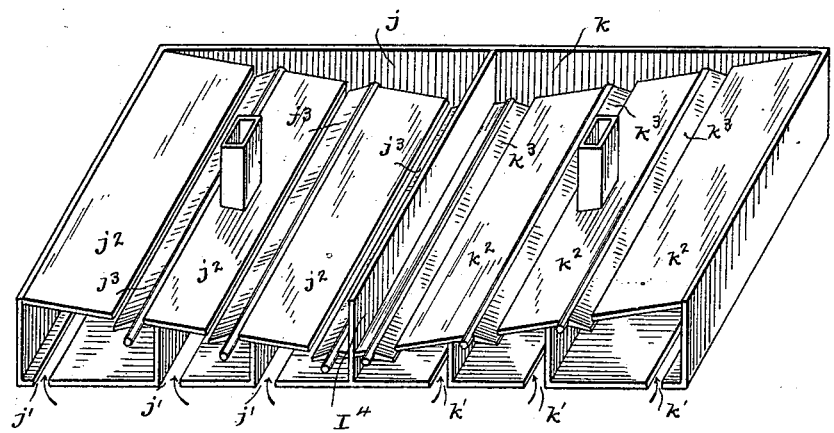

In the drawings, Figure 1 is a side elevation of a machine embodying my invention, parts being broken away for convenience of illustration. Fig. 2 is a vertical longitudinal elevation of the machine as a whole. Fig. 3 is a rear end elevation. Fig. 4 is a vertical transverse section on the line 4 4 of Fig. 2. Fig. 5 is a detail perspective view of the sieves, and Fig. 6 is a detail view showing the air-chambers and valves.

As indicated in the drawings, the exterior frame of the machine is composed of a framework A A', the space between which is inclosed by suitable exterior casing a. The casing is hopper-shaped at its lower portion and provided with a pair of conveyers B B. Above the conveyers is placed a longitudinal air-blast pipe C, which is provided along its top and the upper portions of its sides with narrow longitudinal slits or openings C'. A pressure-blower D supplies air to the pipe C, which issues through the slits C' and passes upward. The slits C' are so placed that the blast will be distributed evenly throughout the hopper-shaped compartment. Above the hopper-shaped compartment are located a pair of sieves E F, which are desirably joined together endwise by flexible arms $f\ f$ to operate as one. The heads of the sieves E F are toward the ends of the machine, where they are supported by links F' F' and E' E', respectively. The tails of the two sieves are separated a short distance and discharged into a spout G, placed adjacent thereto and leading to the exterior of the machine.

$e\ e$ represent connecting-rods, which may be attached to the sieve E and extend through suitable opening in the end wall of the machine, for connection to a vibrating shaft for imparting the desired movement to the sieves. The respective heights or inclinations of the two sieves may be adjusted as desired by means of levers $g\ g'$, which are connected to horizontal shafts H $h$, passing through the machine and provided with cranks H' H' $h'$, from which extend flexible links I I', secured at or near the tail ends of the sieves—the links I to the sieve F and the links I' to the sieve E. Movement of the levers $g\ g'$ will rotate the shafts H $h$, thereby turning the cranks H' $h'$ and raising or lowering the movable ends of the sieves, which are held in desired positions by securing the extremities of the adjusting-levers $g$. A knocker I² is provided with each sieve, the action of which is well understood. Transversely-moving brushes G' G² are provided and operated in the usual manner. The space above the sieves E F is desirably divided into two compartments J K, as by a partition I³. Above the compartments J K is located the valve-chamber, which is divided into compartments $j\ k$ by a partition I⁴, placed centrally with respect to an exhaust-opening L. The compartments $j\ k$ communicate with the compartments J K through suitable openings $j'\ k'$, and the said compartments $j\ k$ are provided with stationary transverse partitions $j^2\ k^2$ and with hinged transverse valves $j^3\ k^3$, adapted, when moved into contact with the edges of the stationary partitions, to close the chambers $j\ k$ and prevent the passage of air therethrough. The axes of the valves $j^3$ extend to the exterior of the machine and are provided with operating-levers M, the extremities of which may engage and be secured between projections or teeth upon segmental indicators M', for indicating upon the exterior of the machine the respective positions of the valves, and also retaining the levers in the desired position. A suction-fan N is connected with both the chambers $j\ k$ through the channel L, leading thereto, and acts when the valves are opened to draw upward through the sieves and their contents and through the space above them and the valve-chamber the air delivered to the lower portion of the machine through the blast-pipe. The purifying action of the air upon the material in the sieves is regulated and controlled in the manner well understood in the art. The fan N discharges the dust and other impurities removed from the middlings to a dust-spout $n$.

Power may be applied to drive the respective parts of the machine in any convenient or desirable manner, the particular means employed forming no part of the present invention. As indicated, a vertical shaft 1, located at the front end of the machine, is geared to the axes of the conveyers for imparting rotary movement thereto, and the said shaft extends upwardly and is geared to a horizontal shaft 2, which is provided with cranks, (shown in Fig. 2,) to which are connected the arms $e\ e$ for transmitting reciprocating movement to the sieves. The shaft 2 is provided with a belt-pulley 3, which is connected by belt 4 with a driving-pulley on the shaft 5, upon which are mounted the rotating blades of the fan N; and also of a second fan O, to be described. The shaft 2 is also provided with a small driving-sprocket 6, which is connected by chain 6ª with sprocket-wheel 7 upon a transverse shaft 8. The shaft 8 is also provided with a worm-pinion in mesh with a worm-gear 9 upon a longitudinal shaft 10, which is provided with lateral projections or teeth 11, arranged in juxtaposition to vertically-extending arms 12 13, attached to the knockers I², so that with each rotation of the shaft 10 the teeth 11 will engage with the arms 12 13 of the knockers, raising them and then moving out of engagement therewith to allow them to fall upon suitable portions of the sieves, as is well understood.

The shaft 14, carrying the fan D, receives power through a driving-belt 15, passing over a pulley 16, also upon the shaft 2.

At the front end of the machine is located a receiving-hopper P, which extends downwardly by a vertical channel $p$ and discharges into the head of the sieve E through spout $p$. A feed-roller P' is located in the neck of the hopper P and driven by a pulley 17 upon a shaft 18, the pulley 17 being belted to a small driving-pulley 19 upon the shaft 8. The stream of middlings is delivered to the hopper P, and by the action of the roller P' is fed downward into the vertical channel $p$, the rate of feed being controlled, as desired, by a pivoted adjustable valve $p^2$. The vertical channel $p$ is provided with a number of inclined surfaces or shelves Q. As seen, four of the shelves Q are provided, two on each side of the channel $p$, so that the material falling into said channel from the feed-roller will drop from shelf to shelf and be spread out and distributed. Four inlet air-openings $q$ are provided in the sides of the vertical channel, as seen, one being located under each of the shelves Q, although I do not confine myself to this particular number or arrangement, as more or fewer of the air-inlets and shelves may be used in practice. Each of the air-inlets $q$ is provided with an adjustable valve $q'$, by which the inlets $q$ may be opened or closed to any desired extent.

The suction-fan O is provided with a trunk O', extending between the fan and the vertical channel L, the said trunk O' terminating in a suction-passage $O^2$, connecting with the vertical passage $p$ in the vicinity of the shelves Q. The fan O being in motion and the valves $q'$ opened to a suitable extent, air will be drawn into the vertical passage $p$ and draw out of the descending stream of middlings all the lighter portions thereof, known as "fine middlings," thus separating the descending stream into fine and coarse middlings, the fine passing to the fan O and the coarse continuing their descent and passing through the spout $p'$ to the head of the coarse-middlings sieve E. The fan O discharges through trunk $O^3$ into an apparatus that I have termed a "catcher." The catcher R is, as shown, a funnel-shaped chamber, although this form is not essential and might be varied without detriment. The chamber R is covered in part or altogether with pervious material or fabric S, which will permit the free escape of air, but not of fine middlings or even dust, a suitable covering material being cotton cloth. Within the chamber R are located a number of vertical diaphragms of reticulated material, such as bolting-cloth or fine wire-gauze. The diaphragms $R'$ $R^2$ $R^3$ $R^4$ fit closely against the top of the chamber R and extend downwardly to within an inch, more or less, of the sides or lower portion thereof. The said diaphragms are of various degrees of fineness, the one $R'$ nearest to the trunk $O^3$ being the coarsest and the last one $R^4$ the finest. The lower portion of the chamber R connects by a suitable passage $r$ with a spout $r'$, arranged to discharge at the head of the fine-middlings sieve F.

To prevent the creation of disturbing or conflicting air-currents the spout $r'$ is provided with a grooved feed-roller $R^5$, mounted upon a suitable shaft 20, which receives motion through a pulley 21 and belt 22, driven from a pulley upon the shaft 14.

The operation of the catcher is to arrest the fine middlings delivered thereto by the blast of the suction-fan O, by which they are withdrawn from the coarse middlings in the vertical channel $p$. The fine middlings entering the catcher R strike first against the coarse vertical diaphragm $R'$, which arrests the larger particles, which then drop downward to the passage $r$. The larger particles of the material passing through the diaphragm $R'$ are arrested by the diaphragm $R^2$, from which they fall downward into the passage $r$. The same action takes place with the succeeding diaphragms, so that everything contained in the air-blast is arrested by one or other of the diaphragms and caused to drop into the passage $r$, passing thence by spout $r'$ and feed-roller $R^5$ to the head of the fine-middlings sieve F. I do not confine myself to the use of any particular number of diaphragms in the catcher R, since a greater or less number may be used in practice without in any manner departing from the invention. The air forced into the catcher by the fan O escapes through the pervious walls thereof without carrying anything whatever therethrough, so that the fine middlings are delivered to the sieve F in their entirety. The subsequent purification of the separated middlings is similar in all respects to the well-known methods of operation by which the dust and impurities are drawn out by suitable currents of air, although, so far as I am aware, no machine has hitherto been constructed in which both fine and coarse middlings could be operated upon at the same time, and this I claim as an important feature of the present invention.

The means for separating the fine from the coarse middlings and for reclaiming the material so withdrawn from the air-blast constitutes a distinct feature of invention and one which may be applied otherwise than as here shown. For example, two separate middlings-purifying machines may be employed in connection with my method of separating the fine from the coarse, the coarse middlings passing to the spout $p'$ being delivered to one machine for purification and the fine middlings from the spout $r'$ to the other. This arrangement will, however, form the subject of a separate application for Letters Patent.

By providing the air-blast pipe C, arranged to distribute its output evenly throughout the whole lower portion of the casing of the machine, I am enabled to dispense with the air-inlet valves usually provided in the lower portion of such a machine and to maintain a more regular and evenly-distributed action than when such inlet-valves are used. The supply of air to be drawn up by the suction-fan N may be readily controlled by varying the speed of the fan D or opening or closing the entrance to the pipe C, as preferred.

Having described my invention, what I claim, and desire to secure by Letters Patent, is—

1. In a middlings-purifier, a grading device comprising a vertical channel, inclined surfaces therein for spreading the material, adjustable valves for admitting air across the channel, and a suction-fan for withdrawing any desired proportion of the descending stream of material, and the catcher for arresting the material withdrawn by the suction-fan, while permitting the blast to escape, constructed, combined, and arranged substantially as described.

2. In a middlings-purifier, the combination and arrangement of a channel for receiving the middlings, a suction-fan for withdrawing the lighter portions thereof, a sieve for receiving and treating the coarse middlings descending through the channel, a second sieve for receiving and treating the fine middlings, and the catcher receiving the blast from the suction-fan and acting to arrest the middlings, while permitting the escape of air, and a channel leading from the catcher to the fine-middlings sieve, constructed and arranged substantially as described.

3. In a middlings-purifier, a separating or grading device comprising a vertical spout having inclined surfaces for spreading the material, an exhaust-fan for withdrawing the lighter portions of the descending stream, and the catcher provided with pervious sides to permit the escape of air and with vertical diaphragms for arresting the stuff, substantially as described.

4. In a middlings-purifier, means for separating fine middlings from an air-blast, comprising the chamber having pervious walls to allow the escape of air, and one or more reticulated diaphragms for arresting the particles of material, substantially as described.

5. In a middlings-purifier, the combination, with a fan for withdrawing fine middlings from coarse, of the catcher for collecting the fine middlings, comprising a chamber having pervious walls to permit the escape of air, and one or more reticulated diaphragms for arresting the particles of material, substantially as described.

6. In a middlings-purifier, the combination of a channel for receiving the middlings, a suction-fan for withdrawing the lighter portion thereof, a sieve for receiving and treating the coarse middlings descending through the channel, the catcher receiving the blast from the suction-fan and acting to arrest the middlings, while permitting the escape of air, a sieve for treating the fine middlings, and a channel leading from the catcher to the said sieve, mechanism for imparting motion to the sieves, and air-chambers and air-controlling valves connected with said sieves, whereby the operation of purifying both grades of middlings may be carried on simultaneously, substantially as described.

In testimony whereof I hereto affix my signature in presence of two witnesses.

CHARLES ORVILLE WRIGHT.

Witnesses:
BEVERLY E. SHORE,
JOSEPH A. JOHNSTON.